Figure 1:
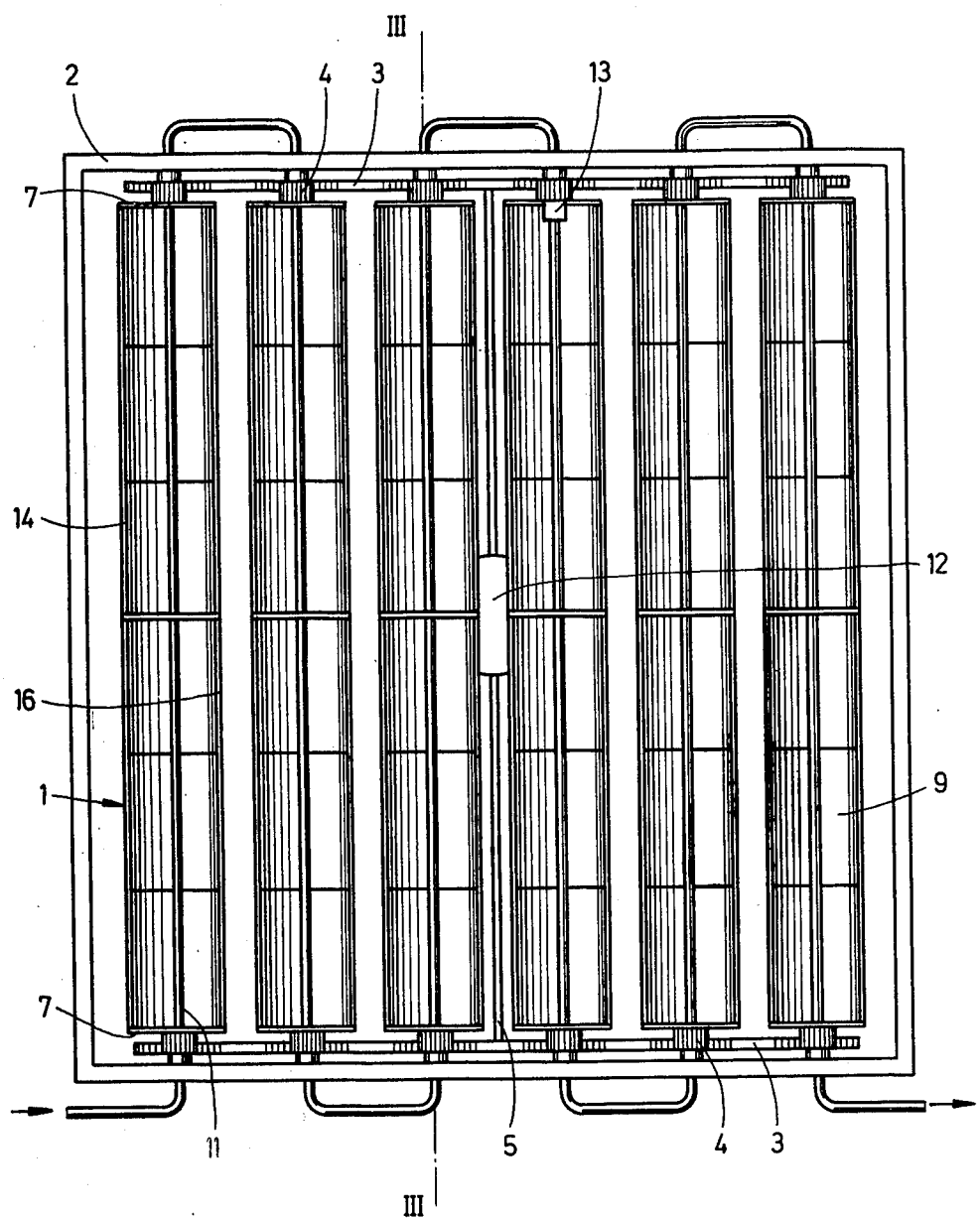

United States Patent [19]

Zaugg et al.

[11] 4,116,221
[45] Sep. 26, 1978

[54] SOLAR ENERGY COLLECTING AND CONCENTRATING APPARATUS

[76] Inventors: Hans Zaugg, Weekendweg 1, Einigen, Canton of Berne, Switzerland, 3646; Harald Liebi, Bolgen, Zweisimmen, Canton of Berne, Switzerland, 3770

[21] Appl. No.: 720,728

[22] Filed: Sep. 7, 1976

[30] Foreign Application Priority Data

Sep. 11, 1975 [CH] Switzerland ............... 11707/75

[51] Int. Cl.² .................................. F24J 3/02
[52] U.S. Cl. ............................ 126/271; 350/293; 350/288; 74/89.11
[58] Field of Search .......... 126/270, 271; 237/1 A; 350/293, 294, 299, 288; 74/89.11

[56] References Cited

U.S. PATENT DOCUMENTS

| 1,162,505 | 11/1915 | Nichols | 126/271 |
| 1,345,758 | 7/1920 | Folsom | 126/271 |
| 1,951,404 | 3/1934 | Goddard | 126/270 |
| 2,133,649 | 10/1938 | Abbot | 126/271 |
| 3,012,294 | 12/1961 | Waldor | 126/270 |
| 3,841,738 | 10/1974 | Caplan | 126/271 |
| 3,847,136 | 11/1974 | Salvail | 126/271 |
| 4,000,734 | 1/1977 | Matlock | 126/271 |

*Primary Examiner*—Kenneth W. Sprague
*Assistant Examiner*—James C. Yeung
*Attorney, Agent, or Firm*—Howard C. Miskin

[57] ABSTRACT

Apparatus for collecting and concentrating solar energy, having parabolic-cylindrical reflector elements driven at both ends and caused to follow up the changing position of the sun, whereby the reflector elements can be of light construction and yet possess the necessary resistance to torsion.

1 Claim, 4 Drawing Figures

SOLAR ENERGY COLLECTING AND CONCENTRATING APPARATUS

This invention relates to apparatus for the utilization of solar energy. More particularly, it relates to apparatus for collecting and concentrating solar energy on an elongated operative region, of the type wherein at least one parabolic-cylindrical reflector element bearing a radiation-reflecting film is disposed on a support structure and provided with a drive arrangement for causing the reflector element to follow up the position of the sun. The invention further relates to an installation comprising a plurality of such apparatus.

Parabolic-cylindrical solar collectors, or collectors for concentrating solar energy, are well known. They are primarily used when a medium is to be heated to higher temperatures, e.g., in order to produce hot water, steam, hot air, or, in recent times, to irradiate solar cells for direct conversion into electricity. A good example of such apparatus is the solar collector installation of Sandia Laboratories in Albuquerque, N. Mex.(cf. Report SAND 75-0278).

At the present time, the successful utilization of solar energy depends upon how economically an installation can be constructed in order for it to be able to compete with the very inexpensive production of energy from the combustion of oil or gas. Only such installations as are structually well-designed have a chance of being economical in operation. In this connection, varied requirements much be met: long life, light weight, and low susceptibility to trouble are general prerequisites. The most important requirement is precise focusing of the solar radiation, even under the influence of disturbances such as wind. Stable designs are the result.

As a rule, therefore, the prior art installations comprise expensive reflector and support structures in order to ensure the necessary rigidity. This greatly impairs the economy of such installations.

It is an object of this invention to provide apparatus of the type initially described in which optimum mechanical strength and stability are achieved with as little expenditure as possible for manufacturing and material, so as to obtain a favorable cost-to-efficiency ratio.

This object is essentially achieved in that, for meeting the strength requirements, not just the reflector or the supporting structure alone, but the entire system consisting of the reflector elements, the supporting structure, and the drive system, is optimized. According to the present invention, merely the resistance to bending of the elongated reflector element in the longitudinal and transverse axes is realized by a simplified reflector structure, while the resistance to torsion of the reflector element is brought about in that the drive takes place at least at both ends of the elongated reflector element simultaneously.

The result of dividing up the resistance functions between the reflector system and the drive system with supporting structure is, for one thing, that a considerable structural portion (for absorption of torisonal moments due to dead weight, drive, and external forces) may be dispensed with for the reflector element (no necessity for shell or truss constructions). For another thing, the bilateral drive of the collector element always ensures the parallel running of both its ends, which is important, especially under the influence of wind or of the driving torque, in order to guarantee precise focusing of the solar radiation over the entire length of the collector element. Relatively great tractional forces can be absorbed by the tie rods of the drive system. According to the present invention, therefore, the drive system is given a dual function in that it also takes over the torisonal-resistance requirements to be met by the reflector element.

To this end, the improvement according to the present invention comprises transmission means included in the drive arrangement for transmitting the driving force for the follow-up movement at two or more locations of the support structure.

The collector installation as a whole, i.e., an installation built up of a plurality of reflector elements disposed parallel to one another, comprises one or more gear racks extending along flush-lying ends of the several apparatus for synchronously moving all the apparatus disposed parallel to one another, these racks engaging the transmission means.

Figure 2:
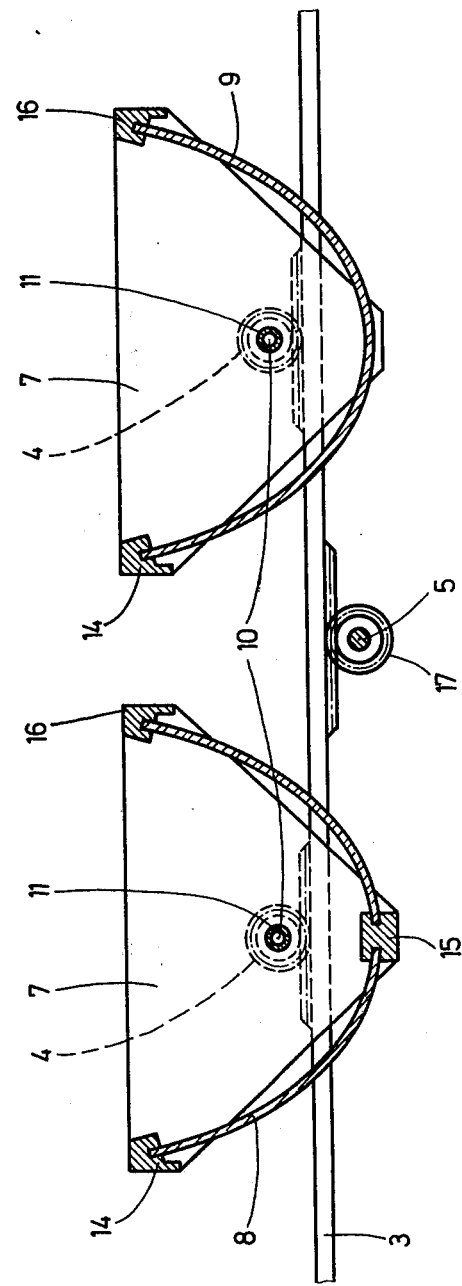
Figure 3:
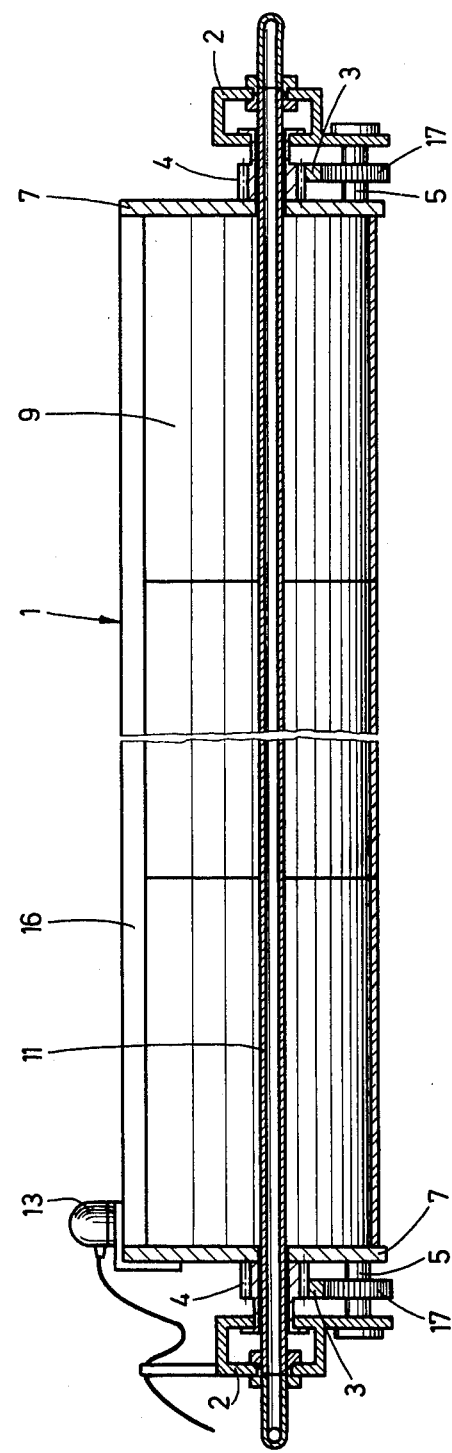
Figure 4:
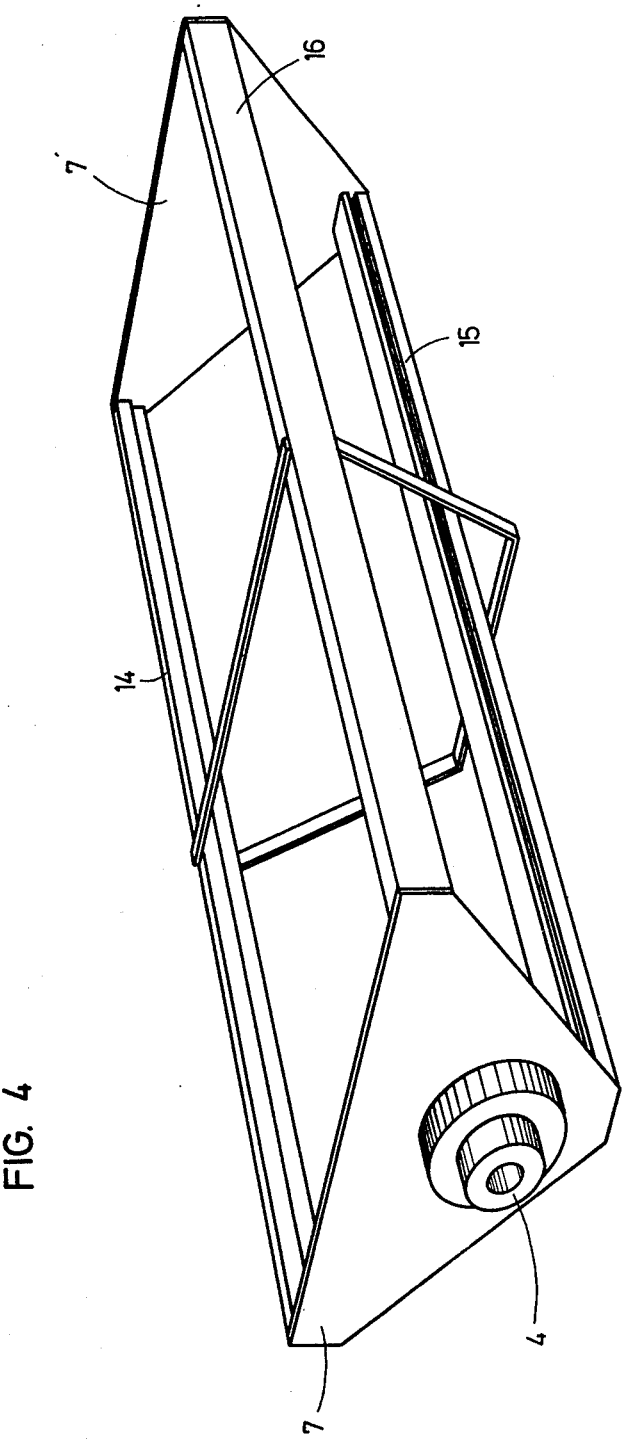

Preferred embodiments of the invention will now be described in detail with reference to the accompanying drawings, in which:

FIG. 1 is a top view of a collector installation comprising a plurality of apparatus according to the invention, FIG. 2 is a cross-section through two different embodiments of the apparatus according to the invention, FIG. 3 is a longitudinal section through a reflector element taken on line III—III of FIG. 1, and FIG. 4 is a perspective view of a mounting for a reflector element.

FIG. 1 shows a number of apparatus for collecting and concentrating solar energy with a follow-up drive arrangement for elongated reflector elements 1, all of which are held in a common support structure 2 and driven at each end by two gear racks 3. Motional impulses act from a centrally disposed drive shaft 5 via gears 17 (FIG. 2) upon both racks 3 simultaneously, so that all parts of elements 1 connected to racks 3 are driven synchronously. Shaft 5 is set in motion by a motor 12.

On the right-hand side of FIG. 2, a reflector element 1 having a continuous reflector surface 9 is depicted, while a reflector element 1 divided into surface sections 8 is shown on the left-hand side. A radiation-reflecting film 18 is applied to reflector surfaces 8, 9. Rack 3 engages respective pinions 4 which are secured to end plates 7 of elements 1 in line with focal axes 10. Cradling supports 14, 15, and 16 are shown, which in the present instance also serve to guide parabolically curved reflector surfaces 8 and 9.

FIG. 3, a longitudinal section through a reflector element 1, shows a solar sensor 13 which may, for example, take the form of two photodiodes separated by a suitable partition. Reflector elements 1 will align themselves according to the particular position of the sun in such a way that both photocells are equally illuminated. Installed along focal axis 10 is an absorber system 11 in which a liquid or gaseous medium is heated.

The mounting for a single reflector element 1 as shown in FIG. 4 comprises end plates 7, cradling supports 14, 15, and 16, and pinions 4 secured to end plates 7 in line with focal axis 10.

For driving a plurality of cylindrical elements 1, tests have shown that the use of racks 3 is indicated since besides fulfilling the conditions for a synchronous drive of all elements 1, they must also, as previously mentioned, absorb traction resulting from external influences acting upon reflector elements 1 as well. This is of particular importance whenever a large number of elements 1 are assembled into a system. The toothing of racks 3 will preferably be made only on certain sections thereof, viz., wherever racks 3 must engage pinions 4 of the element 1 to be driven. It should also be noted for the sake of completeness that each individual reflector element 1 must rotate about the respective focal line, i.e., pinions 4 must be positioned in line with the respective focal axes 10.

Other possible drive means, such as worm drives, bevel drives, and chain or belt drives, have not been used, either because they have not been capable of meeting the requirements for synchronous follow-up of reflector elements 1 or, in some cases, because they have also been eliminated owing to considerations of economy.

Thus the chosen drive arrangement by means of racks 3 enables accurate transmission, free from play, of the motional impulses to all collector reflector elements 1 and can, at the same time, absorb substantial stress as well, such as may originate from wind forces. In particular, racks 3 are also suitable elements because of the dual function they have to perform, as previously mentioned.

The advantages of the apparatus according to the present invention are especially significant when, owing to manufacturing considerations, the elongated reflector element must be made up of individual reflector sections. In this case, for example, in order to fulfill the requirement for bending resistance, longitudinal supports will be used, which serve at the same time as means for precise guidance of the individual reflector sections. Such supports, provided with grooves for guiding the reflectors, can be produced very inexpensively by extrusion. Assembly of the reflector is likewise very simple. No additional structural elements are needed to lend strength inasmuch as the drive, acting at least at both ends, lends the element the necessary torsional resistance.

Since glass reflectors are advantageous in a reflector system for reasons of operating life, cleaning problems, etc., and since they can be efficiently produced in semi-parabolic sections, the apparatus described has proven to be particularly simple. An assembly of prefabricated parts (reflector elements of various lengths) is possible as well since the longitudinal supports can be cut off to the required length. Such a mode of construction would hardly be conceivable in the case of a truss design. The support system for the reflector element can also be a shell construction which may have lessened torsional resistance.

What is claimed is:

1. An installation comprising a frame, a plurality of transversely spaced units rockably supported within said frame for collecting and concentrating solar energy upon at least one pipe for conveying a heat-carrier each unit including a support structure having a pair of longitudinally spaced opposite transversely extending end plates and parabolic-cylindrical reflectors divided into sections and supported by said support structure, means for driving the reflectors to follow the position of the run including a motor drive, characterized in that each support structure includes at least two cradle members extending longitudinally between respective opposite end plates and having longitudinally extending grooves therein engaging corresponding opposite edge of said reflector sections and there are included first and second pinions mounted to respective opposite end plates of each support structure, a first transversely extending rack engaging the first pinions, a second transversely extending rack engaging the second pinions, the motor drive being centrally disposed relative to the installation, a longitudinally extending shaft coupled at the middle thereof to the motor drive and gears affixed to said shaft and engaging each of said racks to synchronously rock said energy collecting units.

* * * * *